INVENTOR.
ADRIAN KOSS

Oct. 22, 1963 A. KOSS 3,107,504
UNIVERSAL JOINT
Filed Jan. 11, 1960 3 Sheets-Sheet 2

INVENTOR
ADRIAN KOSS
BY
ATTORNEY

Oct. 22, 1963

A. KOSS 3,107,504

UNIVERSAL JOINT

Filed Jan. 11, 1960

INVENTOR.
ADRIAN KOSS
BY
ATTORNEY

United States Patent Office 3,107,504
Patented Oct. 22, 1963

3,107,504
UNIVERSAL JOINT
Adrian Koss, Mogadore, Ohio, assignor to Hague Manufacturing Company, Mogadore, Ohio, a corporation of Ohio
Filed Jan. 11, 1960, Ser. No. 3,707
5 Claims. (Cl. 64—7)

This invention relates to improved universal joints which can be used as couplings, sockets, etc. They are designed particularly for transmitting constant-velocity rotary motion at any angle greater than zero and less than 90 degrees.

The invention includes new universal joint assemblies, including new cap and cap-and-ring assemblies, and male members for universal joints in which races of two new designs are provided. The invention also includes the method of making a male member with new races, and machinery therefor.

The universal joints each comprise a male member which terminates in a generally spherical knob or ball and this is located in a generally spherical socket in the female member. The portions of the knob and socket which oppose one another are true spheres. The knob is held in the socket by a cap which is fastened to the outer wall of the socket, and there may be a ring in the socket to save wear on the cap. Ball bearings which separate the knob from the socket are located partially in races in the knob and partially in openings in the socket. The cap holds the balls in the openings in the socket. If there are only two ball bearings in a joint, they are located opposite one another and the races in the knob are straight-line functions. If there are more than two ball bearings—and there may be as many as eight or ten or more—the races are Bernoulliann lemniscates (and will be referred to herein simply as lemniscates).

In a preferred design the knob is flattened or grooved and a spring-pressed member which protrudes from the inner wall of the socket, presses against the flattened or grooved surface, and tends to maintain a predetermined angular relationship between the two members.

The races are evenly spaced about the knob and those which are lemniscates have their longitudinal centers lying in planes which pass through the longitudinal axis of the male member, and are symmetrical with respect to these centerlines; and the two ends are congruent. As the male member is rotated within the female member at the greatest angle at which the two members are designed to deviate from alignment, the path of the ball bearing in each race is a lemniscate. The bottom surface of each such race is flat except that the edge of each race is curved to the radius of the ball bearing in it; and the top edge of each race is preferably beveled, etc. as will be explained to prevent the formation of burrs. These races are made in a manner to be explained and accurately accommodate the ball bearings when the male and female members of a joint are at any permissible angle to one another, and the movement of either member of such a joint transmits constant-velocity rotary motion to the other member.

The lemniscate races are advantageously generated simultaneously as the male member is rotated in a socket or nest at the greatest angle to the axis of rotation at which the two members are designed to be operated. Cutting means is moved radially toward the center of the knob to the required depth and then a planetary rotary motion is imparted to the knob. During the movement of the knob, its longitudinal axis describes a perfect cone, with its apex at the center of the knob. Thus the path cut by each cutting means is a perfect lemniscate; and the raised area or islet formed in the center of each end of the bottom of the race is subsequently removed. In the ultimate assembly, when the male and female members are rotated at the maximum angle to one another, the movement of each ball in its race duplicates the motion of the cutter made during the formation of the race.

The two members of the universal joint are preferably assembled with a cap and preferably also with a ring provided with a circular opening which, when the cap is attached to the female member, holds the male member in the socket.

The invention will be further described in connection with the accompanying drawings, in which—

Figure 1:
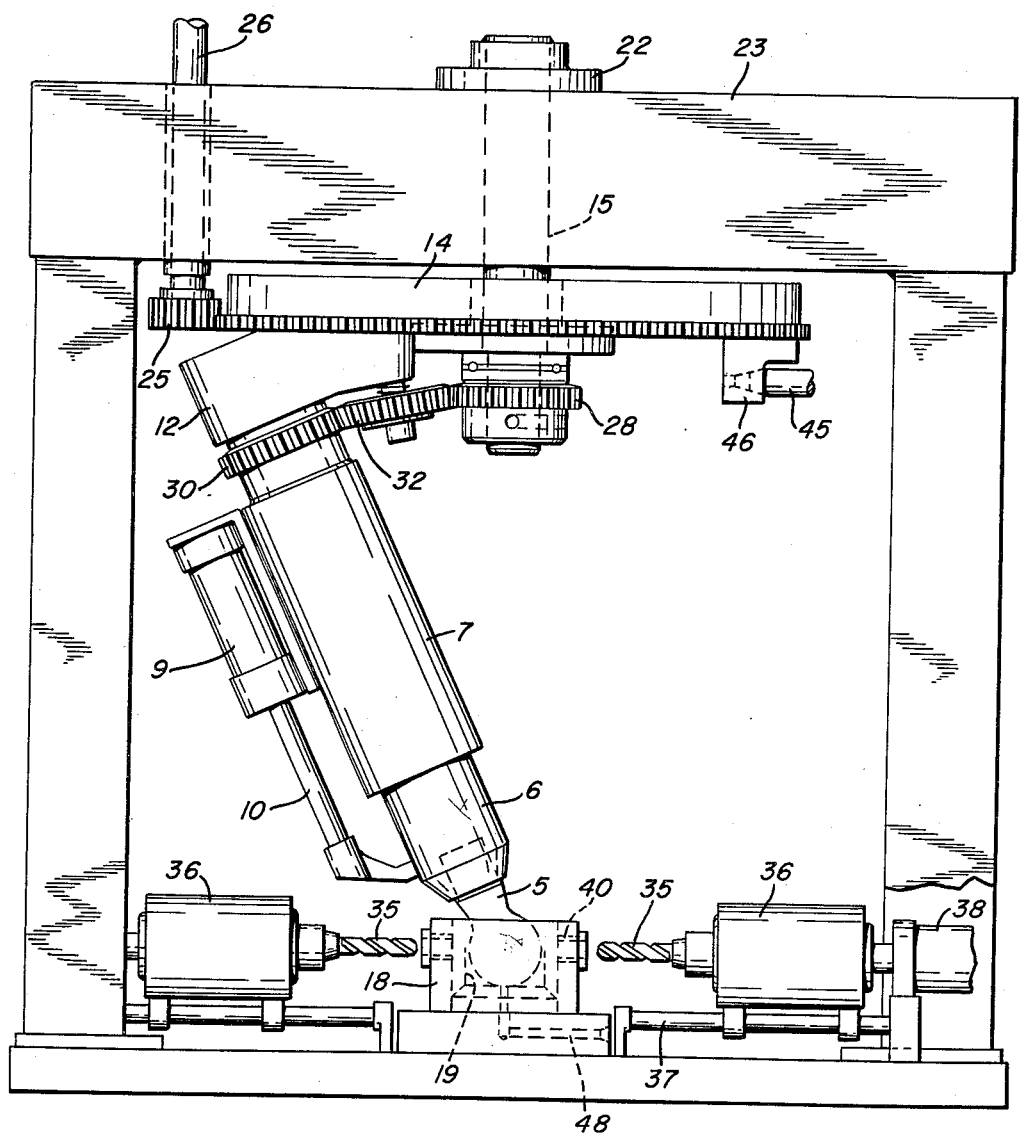
FIG. 1 is an elevation of the equipment for milling the races in a male member of the type in which there are more than two bearing races.

FIGURE 1 shows in rather a schematic manner the equipment used for milling the races. The male member 5 of a universal joint is held in a chuck 6 in the angularly positioned rotating member 7, herein called the cylinder. The chuck may be of any usual design. The air cylinder 9 is illustrative of any type of motive device for lifting and lowering the chuck. The piston 10 raises and lowers the chuck 6 within the cylinder 7. It is to be understood that the cylinder 7 may be of any desired shape and construction.

The cylinder 7 is angularly and rotatably mounted on the bearing block 12 which, in turn, is fastened to rotate with the bull gear 14. The bull gear is rotatably mounted on the stationary main shaft 15 of the apparatus which is positioned exactly above the true center of the fixture 18 and the nest 19 within it. The knob of the male member is centered in the nest as the races are formed so that the center of the knob is then also in line with the axis of the main shaft 15.

The main shaft is supported by any suitable means 22 on the frame 23. The pinion 25 is driven by a motor or any other suitable source of energy through the shaft 26. It meshes with the bull gear and drives it.

The bevel gear 28 is rigidly mounted on the main shaft 15. The bevel gear 30 is rigidly attached to the cylinder 7 and the bearing block 12 so that they all move together. There are the same number of teeth in the bevel gears 28 and 30, and they both mesh with the idler gear 32 so that the motion of the cylinder 7 about the main shaft is a planetary motion, i.e. the cylinder rotates with the same surface at all times farthest from the axis of rotation. Thus, as the male member 5 which is fastened in the cylinder 7, rotates in the nest 19, the movement of the knob with respect to the several cutters 35 is generally up and down.

The inner end of each milling cutter and drill 35 is hemispherical so that it cuts a path with a rounded bottom. It is rotated by any suitable means such as the motor 36. It is moved radially along the rod 37 by the air cylinder 38 or other suitable means. Each is moved out from the nest before the male member is placed therein, or removed therefrom. Preferably, the apparatus provides a cutting member for each race, and they are operated and moved simultaneously. They pass through the drill bushings 40 in the fixture to make contact with the knob. Details for the simultaneous operation of the cutting members are not shown because they can easily be supplied by the man skilled in the art.

Any suitable type of automatic escapement 45, by movement in and out of the stop 46, will stop the movement of the bull gear after each complete revolution. That shown, is withdrawn from the stop after all of the members 35 have made an initial cut into the knob, to the desired depth, and the bull gear is allowed to rotate. The escapement is then returned to the position shown so that it will be contacted by the stop on completion of one revolution of the bull gear. On completion of each complete revolution the cutting members 35 are all simultaneously withdrawn from the nest. The air cylinder may lift the chuck automatically and the finished male member may be replaced by a blank, and returned to the nest, all automatically.

A more detailed explanation follows: The chuck 6 is lifted manually or automatically by the air cylinder 9 and loaded with a blank. A four-way air valve is tripped and the part and chuck move downward until the part rests in the nest 19 within the fixture. It is held down by constant air pressure. Switches, etc. are not shown, as the manner in which such equipment can be used will be obvious to the man skilled in the art, once their use is suggested.

The moment that the male member is seated in the nest, a single-pulse limit switch is energized and opens a four-way air valve causing the cutters to advance and engage the work piece to a pre-set depth. At this moment another single-pulse limit switch energizes the escapement and frees the bull gear 14 for one complete revolution at the end of which it is stopped by the escapement. The pinion 25 driving the bull gear is protected by a slip clutch or other overload protective device.

After completion of the cutting cycle the cutters 35 are withdrawn from the fixture, and the four-way valve which operates the cylinder 9 causes the chuck to rise to a position at which the male member can easily be unloaded and a blank reloaded.

This apparatus mechanically reproduces the true movement of the knob of the universal in its socket during which axial rotation of the knob is prevented due to the ball bearings which interlock the two members of the universal joint assembly. During the cycle the male member 5 is moved in a conical section, the apex of which is at the center of the knob, and the multiple cutters generate the correct paths or races in the surface of the knob which the balls will subsequently duplicate when the universal joint is in use. The cutters which generate these races trace a true lemniscate. All of the races are advantageously generated simultaneously to provide a high production rate.

During the formation of the races, cutting oil or the like and coolant are fed through the line 48 to the nest and there, through multiple passages, to the various cutters.

Each cutter leaves a small raised islet in the center of each end of each lemniscate path. After the male member is removed from the nest 19, this is cut away. The islet is advantageously removed with a concave burr having a radius the same as that at the root of the lemniscate, thereby conforming the bottom of each race to a sphere concentric with the surface of the knob. These races accurately accommodate the ball bearings and transmit constant-velocity motion from one member to the other regardless of the angle of the male and female members to each other.

These knobs with lemniscate races may be used in universal joints of any suitable design.

The knobs of the universal joints of this invention whether they contain two or more races are held in suitable sockets by caps, with or without annular rings in the caps designed to save the caps from wear, all as illustrated in the drawings.

Figure 2:
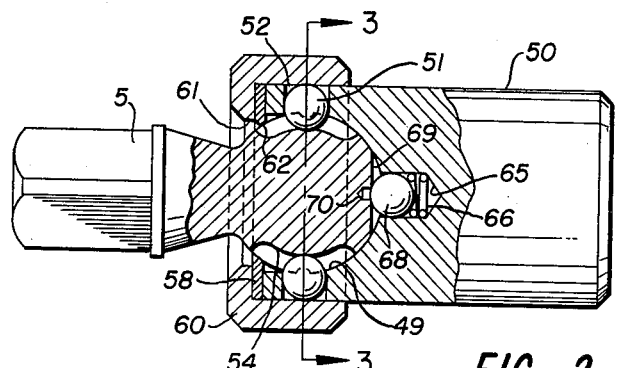
FIG. 2 is a side view, partly broken away, of an assembled universal joint with a male member fabricated on the machine of FIGURE 1.
Figure 3:
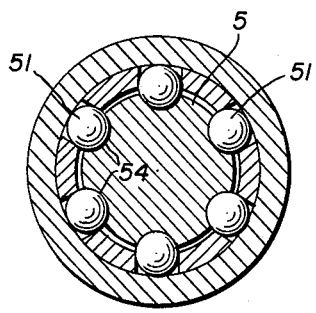
FIG. 3 is a section on the line 3—3 of FIG. 2 showing the two members and the ball bearings.
Figure 5:
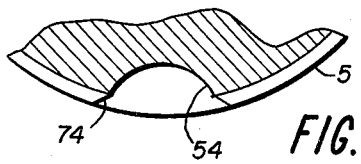
FIG. 5 is a section on the line 5—5 of FIG. 4.
Figure 6:
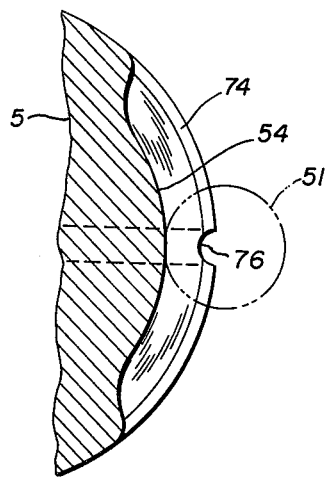
FIG. 6 is a section on the line 6—6 of FIG. 5.

Referring to FIGURE 2, the knob of the male member 5 containing lemniscate races, is placed in the socket 49 of the female member 50. Balls 51, arranged in the same pattern as the drill bushings 40 in the fixture 19, are held in radial, cylindrical openings 52 drilled through the socket. The balls are assembled in the universal joint by insertion through these openings after the male and female members have been assembled and before they are held together by the cap which covers the openings. Because of the manner in which the races are formed, either member will transmit constant-velocity rotary motion to the other member as they are rotated relatively to one another and the balls are moved within the races 54.

It is to be noted that the cylinder 7 (FIG. 1) can be at any angle greater than zero, up to 45 degrees away from the axis of rotation, as represented by the axis of the main shaft 15 and the center of the knob. Thus the resulting joint is operative through any angle greater than zero and not as large as 90 degrees.

The male member is retained in the female member by the ring 58, the inner circumference of which fits against the surface of the knob and holds it within the socket 49. The ring is held in place by the cap 60 which is press-fit to the outer wall of the socket, or held thereto in any other suitable manner. The circular opening 61 in the cap is large enough to slip over the extension 4 of the male member. The use of a ring 58 is optional. If it is a split ring, or is made in separate halves, its inside diameter 62 may be smaller than the largest cross-sectional dimension of the extension 4. If the ring is omitted, the inner circumference of the opening in the cap will bear against the surface of the knob. A ring is desirable, as it may be more readily machined from hard metal than the cap, and will save wear on the cap. Also, when worn, it is less expensive to replace than the cap.

At the bottom of the socket 49 is the opening 65 which holds the spring 66. The ball 68 is pressed by this spring against the flat surface 69 of the male member. This flat surface forms a spherical segment less than a great circle, perpendicular to the axis of the male member. A small depression or detent 70 at the center of this surface may be provided to tend to keep the members aligned, once the ball has been centered on the flat surface. As the male member is moved out of alignment with the female member, some point in the spherical segment is brought nearer the opening 65 and the ball is pressed into it against the pressure of the spring. The tendency is for the spring to expand and apply pressure to the ball and this, in turn, tends to align the two members and locate the ball 68 in the detent 70.

Figure 4:
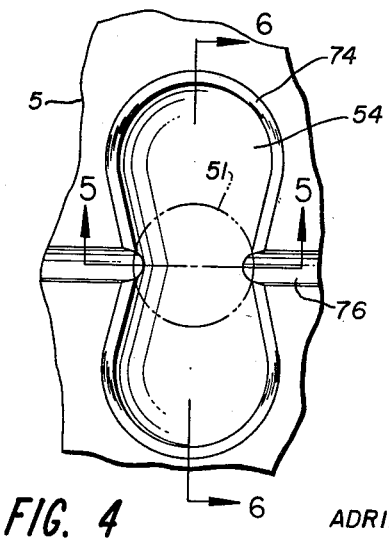
FIG. 4 is a plan view of one of the races.
Figure 7:
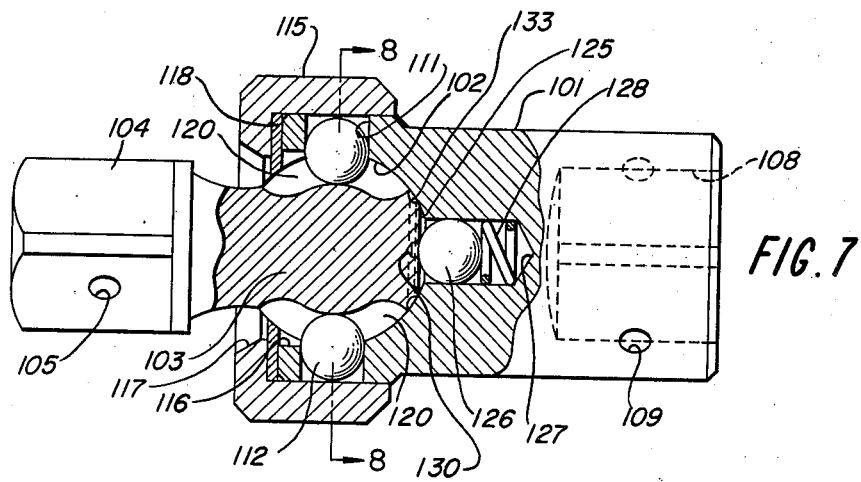
FIG. 7 is an elevation, partly broken away, of an assembled universal joint of the type in which there are only two ball bearings.
Figure 8:
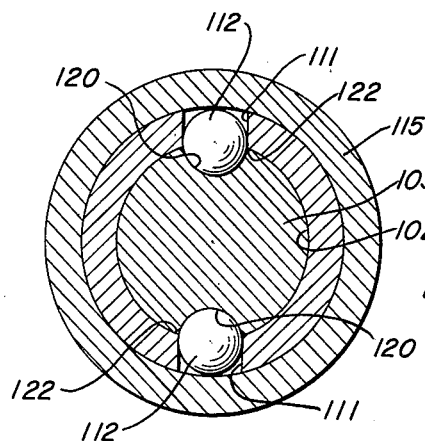
FIG. 8 is a section on the line 8—8 of FIG. 7.
Figure 10:
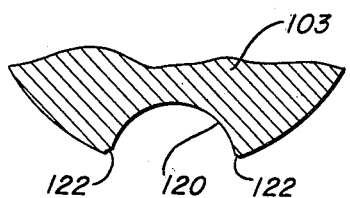
FIG. 10 is a section on the line 10—10 of FIG. 9.
Figure 9:
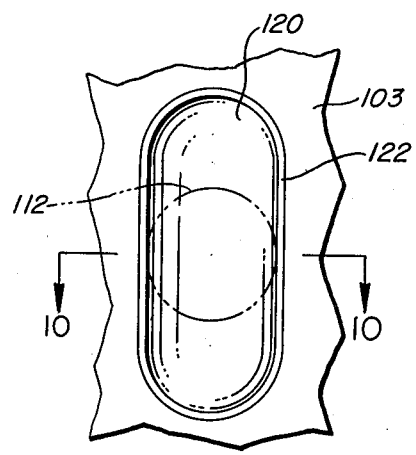
FIG. 9 is an enlarged section of the knob shown in FIGS. 7 and 8, looking into one of the races.

FIGURE 4 shows the outline of the race 54 to be a lemniscate. The edges of the race are preferably beveled at 74 to prevent burrs from forming as the ball is moved under pressure against the wall of its race. Also, to prevent burrs from being raised at the juncture between the two halves of the lemniscate, it is advisable to remove the surface metal where the two halves are joined. This is most easily done by cutting a groove 76 around the knob in a plane perpendicular to the axis of the knob and at its greatest diameter.

FIGURES 7–10 show a similar assembly of a universal joint with only two ball bearings.

The female member 101 is provided with the generally cylindrical socket 102 in which is located the male member 103. The extension 104 of the male member is adapted to fit into an opening in a tool or the like, and the depression 5, although unnecessary is provided for a setscrew to hold such extension in place. There is such an opening 108 in the end of the female member to receive an extension on a tool or the like, and openings 109 therein are tapped for a setscrew to hold the extension.

Cylindrical openings 111 aligned with one another in opposite walls of the socket accommodate the ball bearings 112 of which there are two. The cap 115 is shrunk or otherwise fastened onto the outer wall of the socket over its mouth 116. The cylindrical wall of the cap covers the openings 111 in the wall and holds the ball bearings in place. The diameter of the openings 117 in the cap is less than the diameter of the male member but large enough to slip over the extension 104. The ring 118 is a split ring, or is made in two halves. The joint is assembled by locating the ring about the neck of the male member—between the knob 103 and extension 104—and then slipping the cap over the extension and fastening it to the socket.

The races 120 are parallel with the axis of the male member. They are exactly opposite one another. On the surface of the knob the sides of the races are parallel and are joined by curves at the ends. They are kidney-shaped in the sections shown in FIGS. 7 and 9, to exactly accommodate the contour of the ball bearing when the male member is positioned at different angles in the socket. As the extension 104 of the male member is rotated about the co-center of the male member and the socket, the ball bearings 112 roll in opposite directions in their respective races.

The races 120 are advantageously cut simultaneously by two aligned cutters, cutting into opposite sides of the male member as it is rotated between them. However, since the races in this type of universal joint have perfectly straight sides and are just wide enough to accommodate a ball bearing, they can easily be made one at a time. The rim 122 of each race is advantageously chamfered so as to prevent the formation of burrs as the ball bearing and socket are moved relatively to one another while in use.

If the end of the male member 103, opposite the projection 104 is spherical, the weight of the extension 104 will cause it to fall down. By flattening the end of the male member in the plane 125 which is perpendicular to its axis, and providing a ball 26 in an opening 127 in the female member with a spring 128 behind the ball, the ball is spring-pressed against the surface 125 and this tends to right the projection regardless of the angle to which it is moved. When the ball 126 centers in the small depression 130 at the end of the axis of the male member, the joint is locked with the male and female members aligned although they are readily moved out of alignment. In order to lock the male member the spring 128 must be of sufficient strength to support the extension 104 and any element located in it.

The surface 125 need not be perpendicular to the axis of the male member. If it is desired to hold the male member with its axis at an angle to the axis of the female member, the surface 125 will be at the appropriate angle to the axis of the male member. Alternatively, the male member may be locked at an angle by providing a groove, such as the groove 133 in a plane perpendicular to the axis of the male member. If the groove is not perpendicular to the axis, the extension 104 will be movable in a circle while locked. The male member may be provided with both a flattened end with a depression in its center and also one or more grooves so that the male member may be locked in different positions.

Although usually the universal joint will be of metal, it may be formed of plastic in which case it will ordinarily be molded. Alternatively, the races may be hobbed in. A preferred method of forming lemniscate races in a metal member is shown, but it is understood that there are other ways of forming races of this shape, even in a metal male member.

The drawing shows equipment for cutting lemniscate races in the male member. The same principle can be applied to cutting lemniscate races in the female member. The cutter members will be arranged axially about the center of the spherical portion of the socket but will be directed outwardly. The outline of each race will be a lemniscate. Subsequently its bottom will be finished as a spherical surface concentric with the socket. The balls are held in these races and in radial openings through the female member. In assembling the joints, the balls are put in place after the male and female members have been assembled and before the cap is put on the female member.

This application is a continuation-in-part of my application Serial No. 731,299, filed April 28, 1958.

This invention is covered in the claims which follow.

What I claim is:

1. A universal joint which comprises a female member with a spherical socket therein, a male member terminating in a generally spherical knob rotatably positioned in said socket, said spherical portions of the two members being concentric, at least three ball bearings partially held in equidistant openings in the wall of the socket just large enough to receive them, which openings lie in a plane that passes through the center of said members, with said ball bearings also partially held in equidistant races in the male member each having a Bernoullian lemniscate outline with its longitudinal centerline perpendicular to said plane, the edge of each race being beveled with a deep bevel which prevents burr formation and there being a groove surrounding the male member in a plane that passes between two halves of each race.

2. A universal joint which comprises a female member with a spherical socket therein, a male member terminating in a generally spherical knob rotatably positioned in said socket, said spherical portions of the two members being concentric, at least three ball bearings partially held in equidistant openings in the wall of the socket just large enough to receive them, which openings lie in a plane that passes through the center of said members, with said ball bearings also partially held in equidistant races in the male member each having a Bernoullian lemniscate outline with its longitudinal centerline perpendicular to said plane, a surface of the knob being flat on a segmental plane and there being a depression in the wall of the socket on the radius perpendicular to that plane, with pressure means in the depression applying pressure against the plane whereby the pressure means tends to bring the segmental plane perpendicular to said radius.

3. A universal joint which comprises a female member with a spherical socket therein, a male member terminating in a generally spherical knob rotatably positioned in said socket, said spherical portions of the two members being concentric, at least three ball bearings partially held in equidistant openings in the wall of the socket just large enough to receive them, which openings lie in a plane that passes through the center of said members, with said ball bearings also partially held in equidistant races in the male member each having a Bernoullian lemniscate outline with its longitudinal centerline perpendicular to said plane, the surface of the knob being flat on a segmental plane perpendicular to the axis of the male member, with a depression in the wall of the socket in line with the axis of the male member when the two members are in alignment, with pressure means located in said depression pressed against said flat surface by means within the depression.

4. A universal joint which comprises a female member with a spherical socket therein, a male member terminating in a generally spherical knob rotatably positioned in said socket, said spherical portions of the two members being concentric, at least three ball bearings partially held in equidistant openings in the wall of the socket just large enough to receive them, which openings lie in a plane that passes through the center of said members, with said ball bearings also partially held in equidistant races in the male member each having a Bernoullian lemniscate outline with its longitudinal centerline perpendicular to said plane, the surface of the knob being flat on a plane perpendicular to the axis of the male member, with a depression in the wall of the socket in line with the axis of the male member when the two members are in alignment, with a spring in the depression and a ball therein which is pressed outwardly by the spring against said flat surface.

5. A universal joint which comprises a female member with a spherical socket therein, a male member terminating in a generally spherical knob rotatably positioned in said socket, said spherical portions of the two members being concentric, at least three ball bearings partially held in equidistant openings in the wall of the socket just large enough to receive them, which openings lie in a plane that passes through the center of said members, with said ball bearings also partially held in equidistant races in the male member each having a Bernoullian lemniscate outline with its longitudinal centerline perpendicular to said plane, with a groove surrounding the male member in a plane that passes between the two halves of each race.

References Cited in the file of this patent

UNITED STATES PATENTS

| | | |
|---|---|---|
| 777,383 | Matson et al. | Dec. 13, 1904 |
| 1,021,924 | Fetzer | Apr. 2, 1912 |
| 1,269,808 | Gray et al. | June 18, 1918 |
| 1,591,398 | Newbold | July 6, 1926 |
| 1,854,897 | Ganster | Apr. 19, 1932 |
| 2,646,669 | Barbier | July 28, 1953 |
| 2,653,456 | Heym | Sept. 29, 1953 |
| 2,766,512 | Hatebur | Oct. 16, 1956 |
| 2,844,013 | Spence | July 22, 1958 |

FOREIGN PATENTS

| | | |
|---|---|---|
| 3,521 | Great Britain | July 27, 1907 |
| 408,660 | Great Britain | Apr. 16, 1934 |
| 852,219 | France | Oct. 23, 1939 |